US009063676B2

(12) United States Patent
Morales

(10) Patent No.: US 9,063,676 B2
(45) Date of Patent: Jun. 23, 2015

(54) DYNAMIC PDL SUBSET SELECTION AND PROCESSING

(75) Inventor: Javier A. Morales, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1263 days.

(21) Appl. No.: 12/265,443

(22) Filed: Nov. 5, 2008

(65) Prior Publication Data

US 2010/0110477 A1    May 6, 2010

(51) Int. Cl.
G06F 3/12    (2006.01)

(52) U.S. Cl.
CPC ............ G06F 3/1205 (2013.01); G06F 3/1247 (2013.01); G06F 3/1248 (2013.01); G06F 3/125 (2013.01); G06F 3/1253 (2013.01); G06F 3/1285 (2013.01)

(58) Field of Classification Search
USPC ................................................. 358/1.1–1.16
See application file for complete search history.

(56) References Cited

U.S. PATENT DOCUMENTS

| 2002/0018235 A1* | 2/2002 | Ryan et al. ............. 358/1.15 |
| 2005/0286063 A1* | 12/2005 | Owen et al. ............ 358/1.13 |
| 2007/0229896 A1* | 10/2007 | Fujimori et al. ....... 358/1.16 |
| 2008/0186542 A1* | 8/2008 | Martin et al. .......... 358/1.18 |

FOREIGN PATENT DOCUMENTS

EP    962854 A2 * 12/1999 ............... G06F 3/12

* cited by examiner

*Primary Examiner* — Benny Q Tieu
*Assistant Examiner* — Michael Y Tzeng
(74) *Attorney, Agent, or Firm* — Richard H. Krukar; Luis M. Ortiz; Kermit D. Lopez

(57) ABSTRACT

The page descriptions in a document description describe individual document pages. Some of those pages require special processing. Special processing is accomplished by applying subtasks to page descriptions. The subtasks are associated with subset criteria. A subtask is applied to a page description if and only if the page description meets a subset criterion associated with that subtask. In essence, subtasks are prepress operations applied to and limited to the scope of individual page descriptions with the document description. As such, a modified prepress module is ideal for subtask application. In general, page descriptions are evaluated against the subset criteria and the subtasks applied before the more generalized prepress processing converts the document description into a print ready document description.

20 Claims, 6 Drawing Sheets

DYNAMIC PDL SUBSET SELECTION AND PROCESSING

TECHNICAL FIELD

Embodiments are related to printing processes. Embodiments are also related to the prepress operations and the prepress processing of job tickets, document descriptions, and PDL files.

BACKGROUND

Producing documents in modern print shops often requires that a number of distinct process steps be followed. Document descriptions are usually page description language (PDL) files. The PDL files contain instructions and data describing and specifying document. A user desiring a specific document typically submits a job ticket specifying the PDL file or files to process as well as additional PDL instructions that specify job parameters. A job ticket, once submitted, goes through prepress processing and then through print processing. Print processing is performed by a printing engine that precisely applies ink (or dye, etc.) to media but typically has limited capabilities for data processing, page layout, imposition, and other operations. Preprint processing can perform those operations. Preprint processing is often performed by preprint modules that are instantiated by software programs running on a general purpose computer.

Just as documents are made of pages, document descriptions include page descriptions. Page descriptions are groups of PDL instructions that describe a single page. During processing and printing, the page descriptions are processed and the pages printed.

Many users and print shops have special requirements. In particular, special treatment for certain document pages is required. For example, certain page sizes can require special binding or folding. Chapter starts on even pages can also require special processing. The required special processing is not generic because different users and different print shops often want unique solutions. Printing engines, being complex and special purpose machines, can be very difficult and expensive to modify. As such, special requirements are typically programmed into the prepress module. Regardless, preprint module programming can also be difficult and expensive because such programming is a specialized skill. Systems and methods that ease the programming of specialized requirements for document pages are required.

BRIEF SUMMARY

Aspects of the embodiments address limitations and flaws in the prior art by automatically changing the size of the imposed sheet, which is herein termed sheet resizing.

It is therefore an aspect of the embodiments to obtain subset criteria and subtasks. The subset criteria and subtasks are associated with one another. There is no requirement that they be uniquely associated with one another. The subset criteria and the subtasks can be defined by a user such as a print shop employee.

It is another aspect of the embodiments to accept a job ticket. A job ticket contains at least one document description. A document description contains at least one page description.

It is yet another aspect of the embodiments to evaluate each page description to determine which pages meet any of the subset criteria. A page meeting a subset criterion is automatically associated with any subtasks also associated with that particular subset criterion. One way to accomplish the automatic association of page descriptions is to use subsets. Subsets are defined and associated with at least one subset criterion and at least one subtask. A subtask is associated with a subset if and only if it is associated with a subset criterion that is also associated with the subset. Every page meeting a subset criterion can be added to all the subsets associated with that particular subset criterion.

It is also an aspect of the embodiments to apply all the subtasks associated with a document page to that particular document page. For example, a non-empty subset can indicate that a preprint module run every subtask associated with that subset on every page in that subset.

It is a further aspect of the embodiments that the prepress engine processes the entire document description to produce a print ready document description. The print ready document description is then printed to produce a printed document.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

The page descriptions in a document description describe individual document pages. Some of those pages require special processing. Special processing is accomplished by applying subtasks to page descriptions. The subtasks are associated with subset criteria. A subtask is applied to a page description if and only if the page description meets a subset criterion associated with that subtask. In essence, subtasks are prepress operations applied to and limited to the scope of individual page descriptions within the document description. As such, a modified prepress module is ideal for subtask application. In general, page descriptions are evaluated against the subset criteria and the subtasks applied before the more generalized prepress processing converts the document description into a print ready document description.

Figure 1:
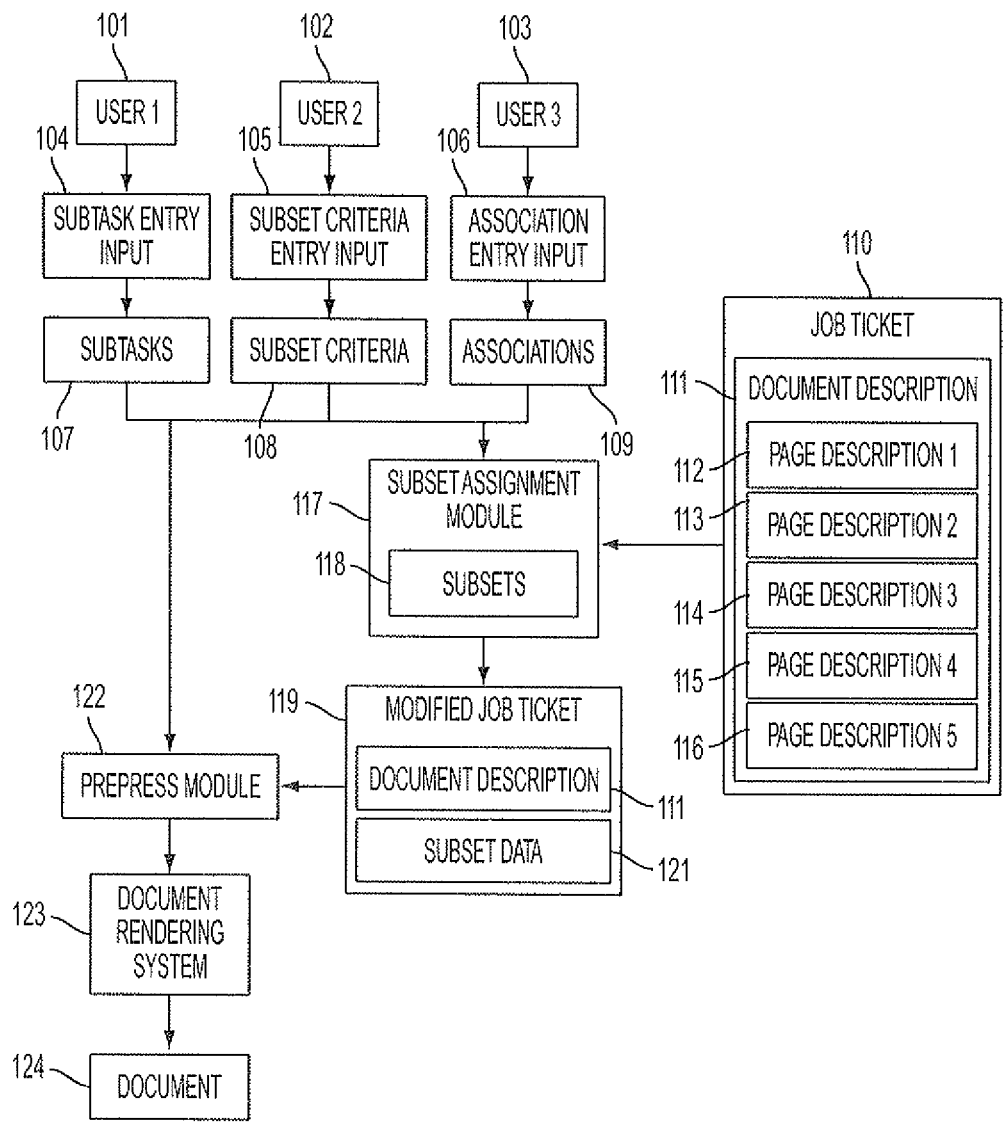
FIG. 1 illustrates a system that uses subsets to automatically apply subtasks to page descriptions in accordance with aspects of the embodiments.

FIG. 1 illustrates a system that uses subsets to automatically apply subtasks to page descriptions in accordance with aspects of the embodiments. A first user 101 uses a subtask entry input 104 to create and edit subtasks 107. A second user 102 uses a subset criteria entry input 105 to create and edit subset criteria 108. A third user 103 uses an association entry input 106 to create and edit associations 109. A subtask is an instruction or group of instructions for modifying a single page description. A subset criterion is one or more conditions that a page description can meet. An association links a subset criterion and a subtask.

For example, an 11" by 17" page size can be a subset criterion. A subtask can contain instructions to rotate 90 degrees clockwise and scale to 8.5" by 11". The exemplary subtask and subset criterion can be linked by an association.

A subset assignment module 117 can define subsets 118 that are also associated with the subset criteria 108 and subtasks 107. For example, every subset criterion can be uniquely associated with a subset. The subset assignment module can receive a job ticket 110 containing a document description 111. The document description 111 contains a number of page descriptions such as page description 1 112, page description 2 113, page description 3 114, page description 4 115, and page description 5 116.

The subset assignment module 117 evaluates each page description against each subset criterion. If a page description meets a subset criterion, then it is added to each and every subset associated with that subset criterion. The subset assignment module 117 can produce a modified job ticket 119 containing the document description 111 and subset data 121. The subset data 121 reports the contents of the subsets. The modified job ticket 119 can also contain copies of some of the subtasks 107 and associations 109.

As illustrated in FIG. 1, the modified job ticket 119, the associations 109, and the subtasks 107 are independently passed to a prepress module 122. The prepress module 122 applies the subtasks 107 to the page descriptions as indicated by the associations 109 and subsets 118. The associations 109 discussed herein have a reflexivity property. If a subtask and a subset are both associated with the same subtask criterion, then the subtask and subset are also associated. The prepress module 122 applies the subtasks 107 to the subsets 118 by applying every subtask associated with a subset to every page description in the subset.

After applying the subtasks 107 to the subsets 118, the prepress module performs normal prepress operations on the modified job ticket 119 to produce a print ready document description. One of the prepress operations can be stripping out any subset data 121, subtasks 107, or associations 109. A document rendering system 123 then produces a document 124 from the print ready document description.

Figure 2:
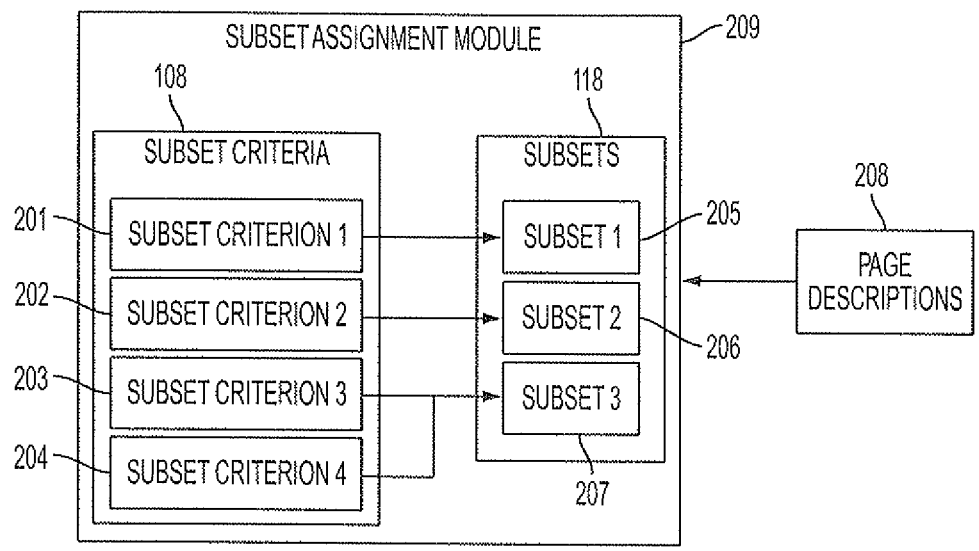
FIG. 2 illustrates assigning page descriptions to subsets in accordance with aspects of the embodiments.

FIG. 2 illustrates assigning page descriptions 208 to subsets 118 in accordance with aspects of the embodiments. Subset criteria 108 are associated with subsets 118. Subset criterion 1 is associated with subset 1 205. Subset criterion 2 is associated with subset 2 206. Subset criterion 3 204 and subset criterion 4 204 are both associated with subset 3 207. The subset assignment module 209 has obtained the subset criteria 108 and used them to define subsets 118. Subset 3 can be associated with two of the subset criteria 108 based on a number of factors. For example, an embodiment can define a subset for each subtask and uniquely associate subtasks and subsets. As such, a subtask associated with two subset criteria would be uniquely associated with a subset associated with those same two subset criteria.

Page descriptions 208 can be passed to the subset assignment module 209. The subset assignment module 209 evaluates each one of the page descriptions 208. If a page description meets a subset criterion, then it is assigned to every subset associated with that subset criterion.

Figure 3:
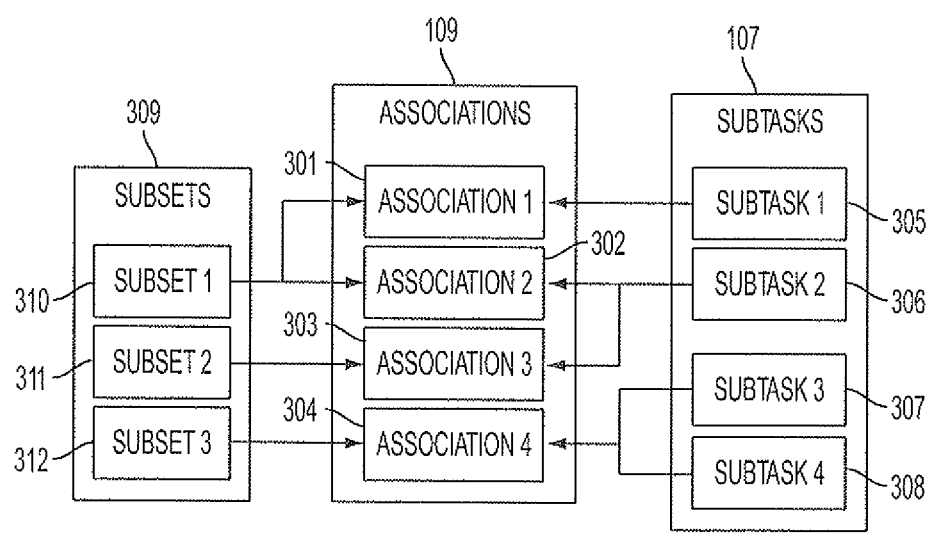
FIG. 3 illustrates associated subsets and subtasks in accordance with aspects of the embodiments.

FIG. 3 illustrates associated subsets 309 and subtasks 107 in accordance with aspects of the embodiments. An embodiment can define a subset for each subset criterion and uniquely associate the subsets and the subset criteria. Such an embodiment would create three subsets when presented with three subset criteria. In such as case, the associations 109 between the subset criteria and the subtasks 107 are equivalent to the associations between the subsets 309 and the subtasks 107. Association 1 301 associates subset 1 310 with subtask 1 305. Association 2 302 associates subset 1 310 with subtask 2 306. Association 3 303 associates subset 2 311 with subtask 2 306. Association 4 304 associates subset 3 312 with subtask 3 307 and with subtask 4 308.

Figure 4:
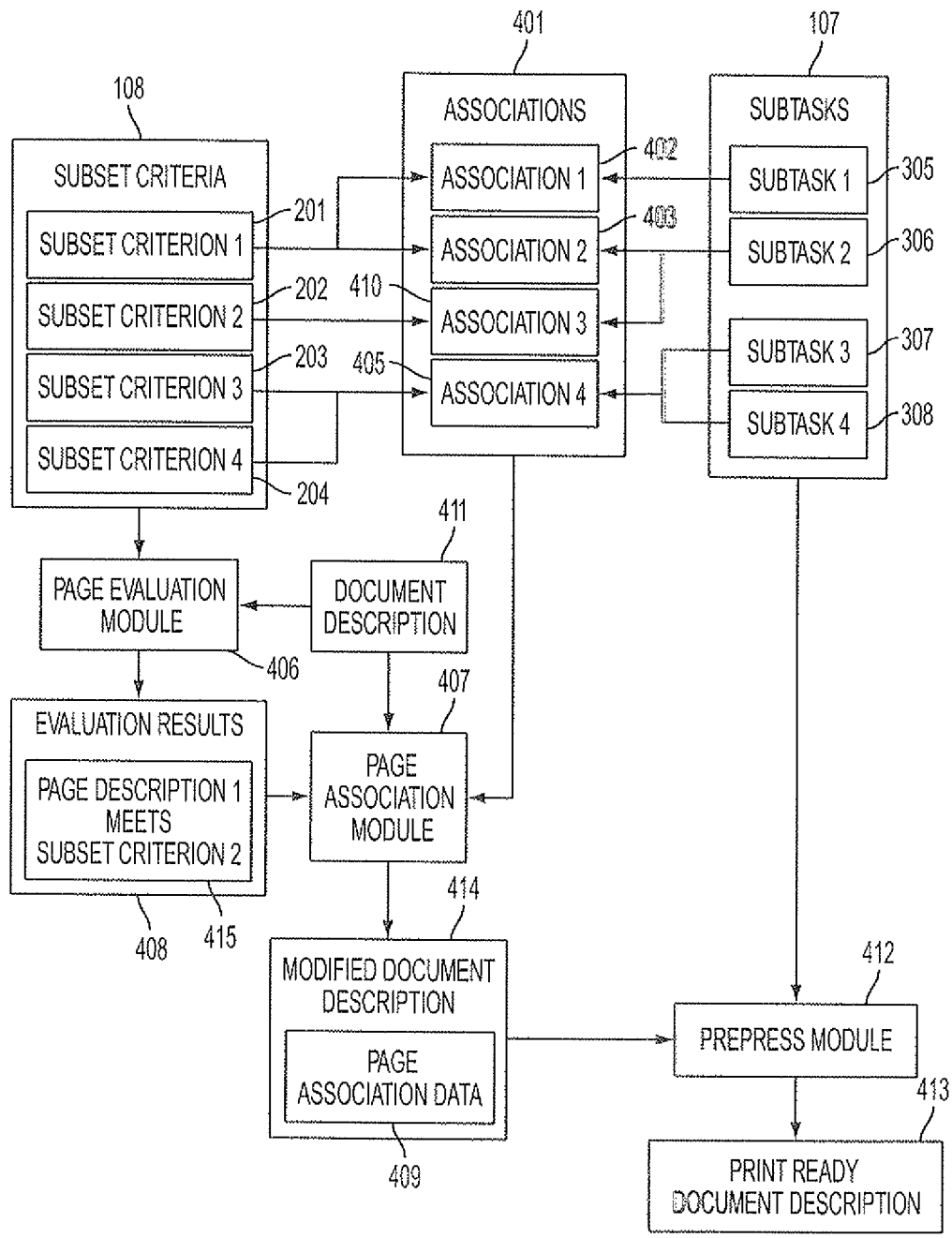
FIG. 4 illustrates a system that automatically applies subtasks to page descriptions without using subsets in accordance with aspects of the embodiments.

FIG. 4 illustrates a system that automatically applies subtasks 107 to page descriptions without using subsets in accordance with aspects of the embodiments. Association 1 402 associates subset criterion 1 201 with subtask 1 305. Association 2 403 associates subset criterion 1 201 with subtask 2 306. Association 3 414 associates subset criterion 2 202 with subtask 2 306. Association 4 405 associates subset criterion 3 203 and subset criterion 2 204 with subtask 3 307 and with subtask 4 308.

A page evaluation module 406 evaluates the page descriptions in a document description 411 against the subset criteria 108 and produces evaluation results 408. The evaluation results 408, illustrated as indicating that the first page description meets subset criterion 2 415, are then passed to a page association module 407. The page association module produces a modified document description 414 based on the evaluation results 408, the document description 411, and the associations 401. The modified document description 414 contains page association data 409. When the first page description meets subset criterion 2 then the page association data indicates that subtask 2 should be applied to page description 1. The prepress module 412 can then produce a print ready document description 413 by applying subtask 2 306 as instructed before processing the whole of the modified document description 414.

Figure 5:
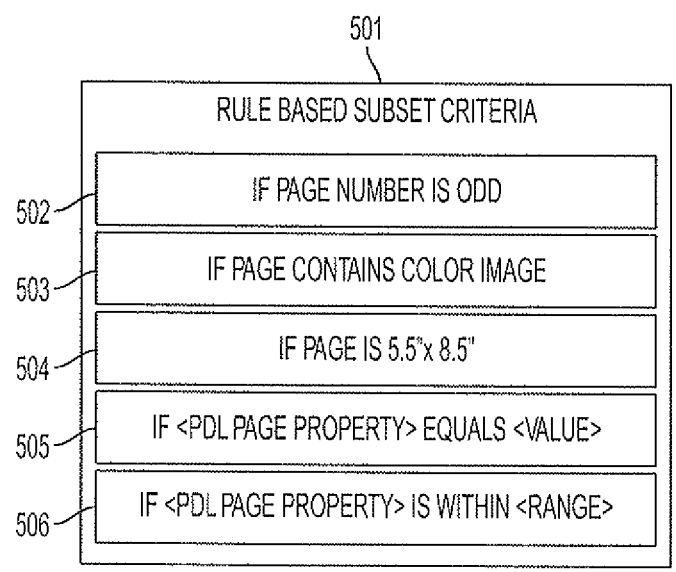
FIG. 5 illustrates rule based subset criteria in accordance with aspects of the embodiments.

FIG. 5 illustrates rule based subset criteria 501 in accordance with aspects of the embodiments. The first rule based subset criterion 502 is met by a page description if the page number is odd. The second rule based subset criterion 503 is met by a page description of a page containing a color image. The third based subset criterion 504 is met by a page description of a page measuring 5.5 inches by 8.5 inches. The fourth rule based subset criterion 505 shows the general form of a rule testing a page property against a value. For example, width equals 5.5 inches. The fifth rule based subset criterion 506 shows the general form of a rule testing a page property against a range. For example, width is greater than 3 and less than 10. Other types of rules are possible such as testing against a set of values. Note that the third rule 504 is actually a compound rule comparing two page properties, width and height, to values, 5.5" and 8.5", respectively.

Figure 6:
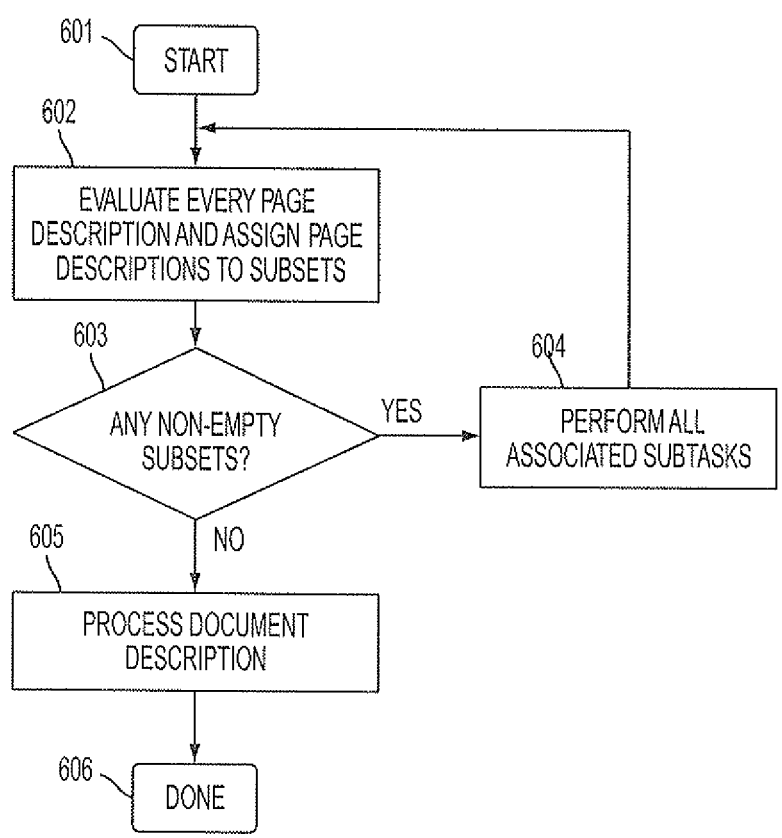
FIG. 6 illustrates a high level flow diagram of a process applying subtask to page descriptions in accordance with aspects of the embodiments.

FIG. 6 illustrates a high level flow diagram of a process applying subtasks to page descriptions in accordance with aspects of the embodiments. After the start as indicated at block 601, every page description is evaluated and some page descriptions are assigned to subsets as illustrated at block 602. If there are no non-empty subsets as depicted at block 603, then the normal prepress operations are applied to the document description as a whole as described at block 605 before the process is completed as indicated at block 606. Otherwise, the subtasks are applied to the subsets 604 and the process loops back to the evaluation step 602. The purpose of looping back is that subtask application as illustrated at block 604 can result in new instances of page descriptions meeting subset criteria. Note that some subtasks may flag a page description to never meet a particular subset criterion. For example, an odd numbered page description can emerge from subtask application slightly changed but still odd numbered. The flagging avoids having an endless loop.

Figure 7:
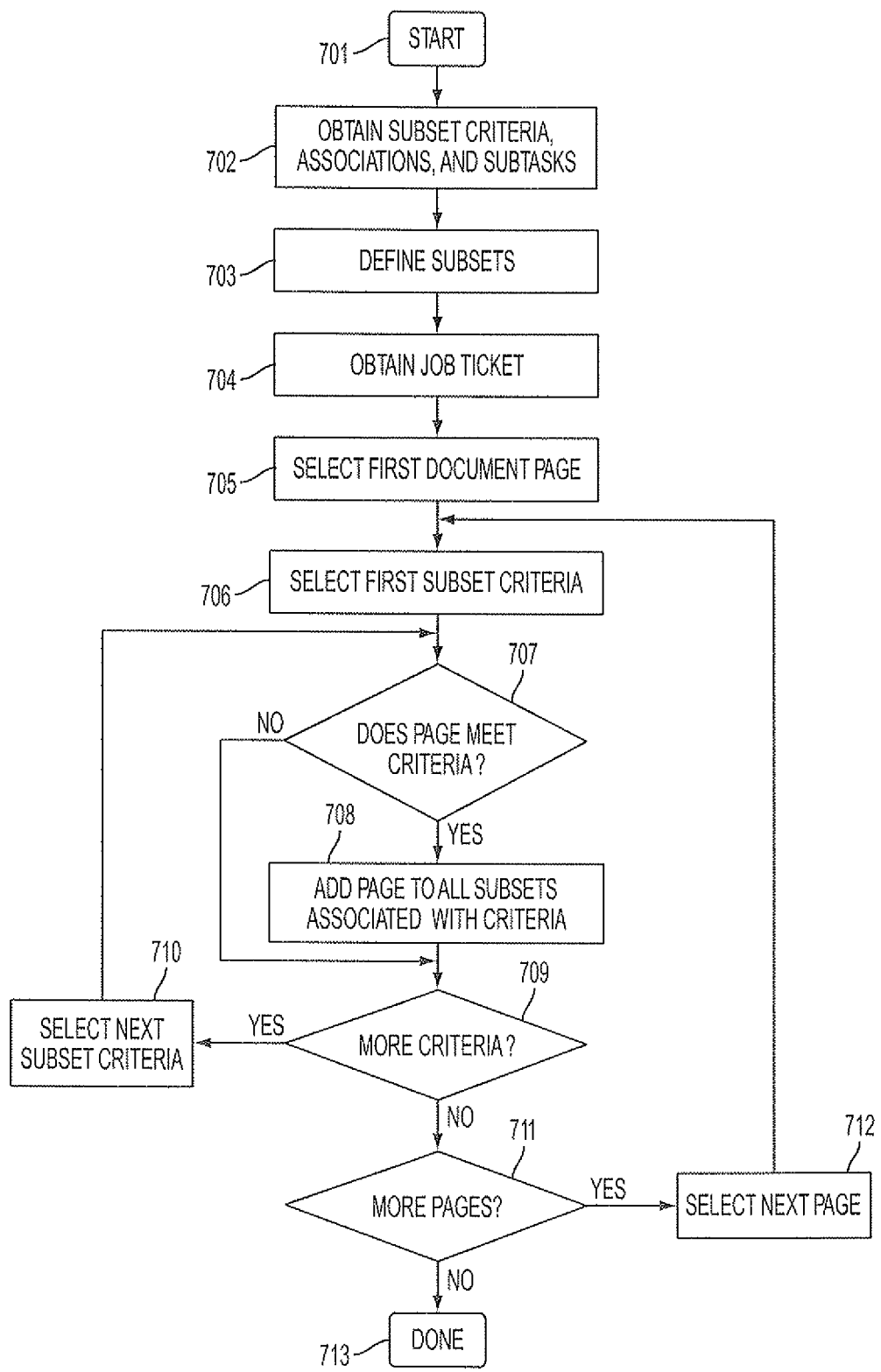
FIG. 7 illustrates a high level flow diagram of a process assigning page descriptions to subsets in accordance with aspects of the embodiments.

FIG. 7 illustrates a high level flow diagram of a process assigning page descriptions to subsets in accordance with aspects of the embodiments. Note that the process flow of FIG. 7 can be considered as an expansion of the processing called for in block 602. After the start as indicated at block 701, subset criteria, associations, and subtasks are obtained as depicted at block 702. Next subsets are defined as described at block 703 and a job ticket is obtained as shown at block 704. The job ticket has a document description containing page descriptions. The first document page is selected as illustrated at block 705 and the first of the subset criteria is selected as indicated at block 706. If the page description meets the subset criteria as described at decision block 707, then the page description is added to all the subsets associated with the subset criterion as shown at block 708. If there is another subset criterion as depicted at block 709, then the next subset criterion is selected as illustrated at block 710 before the process loops back to test the page description against that subset criterion as indicated at block 707. If there are no more subset criteria to test against a page description as described at block 709, then the process checks for more page descriptions as depicted at block 711. If there are no more page descriptions 711, then the process is done as illustrated at block 713. Otherwise, the process selects the next page as depicted at block 712 and loops back to selecting the first subset criterion as indicated at block 706.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method performed by a computer operating in concert with a document rendering system, the method comprising:
the computer obtaining a plurality of subset criteria, a plurality of subtasks, and a plurality of associations wherein the associations non-uniquely associate the subset criteria with the subtasks;
the computer accepting a job ticket wherein the job ticket comprises a document description, wherein the document description comprises a plurality of page descriptions, and wherein the subset criteria, subtasks, and criteria are already obtained;
the computer evaluating the page descriptions to identify at least one subset page meeting one of the subset criteria;
the computer assigning the at least one subset page to a subset;
the computer applying one of the subtasks to the subset pages wherein the one of the subtasks is associated with the one of the subset criteria;
submitting the document description to a prepress module to obtain a print ready document description; and
printing the print ready document description to obtain a printed document.

2. The method of claim 1, wherein the subset criteria are rule based subset criteria.

3. The method of claim 2, further comprising:
the computer accepting a new subtask from a user;
the computer adding the new subtask to the subtasks;
the computer accepting a new subset criterion from the user; and
the computer adding the new subset criterion to the subset criteria.

4. A system comprising:
a computer, a prepress module, a document rendering device, a plurality of subset criteria, a plurality of subtasks, and a plurality of associations wherein the associations non-uniquely associate the subset criteria with the subtasks and wherein the system performs a set of steps, the steps comprising:
defining a plurality of subsets wherein each of the subsets is initially empty, wherein each of the subsets is associated with at least one of the subset criteria and is thereby also associated with at least one of the subtasks;
accepting a job ticket comprising a document description comprising a plurality of page descriptions;
assigning at least one of the page descriptions to at least one of the subsets such that each of the page descriptions meeting a particular one of the subset criteria is assigned to each of the subsets associated with the particular one of the subset criteria;
applying each of the subtasks associated with each one of the subsets to those of the page descriptions assigned to each of the subsets;
producing a print ready document description based on the document description; and
printing the print ready document description to obtain a printed document.

5. The system of claim 4, the steps further comprising removing assignment data from the job ticket after applying the subtasks and before submitting the document description to the press module and wherein the assignment data is added to the job ticket during the step of assigning at least one of the page descriptions to at least one of the subsets.

6. The system of claim 5, wherein the subset criteria comprise a rule based subset criterion and the steps further comprising:
accepting a new subtask from a user;
adding the new subtask to the subtasks;
accepting a new subset criteria from the user;
adding the new subset criterion to the subset criteria; and
accepting at least one association from the user wherein the association associates at least one of the subset criteria with at least one of the subtasks.

7. The system of claim 4, the steps further comprising:
presenting a subtask entry input to a user; and
accepting a new subtask from the user.

8. The system of claim 4, the steps further comprising:
presenting a subset criterion entry input to a user; and
accepting a new subset criterion from the user.

9. The system of claim 4, the steps further comprising:
accepting at least one new association from a user wherein the association associates at least one of the subset criteria with at least one of the subtasks.

10. The system of claim 4, wherein the subset criteria comprise a rule based subset criterion.

11. A method performed by a system comprising a computer operating in concert with a document rendering system, the method comprising:
the system obtaining a plurality of subset criteria, wherein each of the subset criteria is associated with at least one of a plurality of subtasks;
the system accepting a job ticket comprising a document description comprising a plurality of page descriptions and wherein the subset criteria and the subtasks have already been obtained;
the system associating at least one page description with at least one subtask wherein every page description meeting any particular one of the subset criteria is associated with every subtask associated with that particular one of the subset criteria;
the system applying every subtask associated with any one of the page descriptions to every page description associated with the subtask being applied;
the system submitting the document description to a pre-press module to obtain a print ready document description; and
the system printing the print ready document description to obtain a printed document.

12. The method of claim 11, further comprising the system removing association data from the job ticket after applying the subtasks and before submitting the document description to the press module and wherein the association data is added to the job ticket during the step of associating at least one page description with at least one subtask.

13. The method of claim 12, wherein the subset criteria comprise a rule based subset criterion.

14. The method of claim 13, further comprising:
the system accepting at least one of the subtasks from a user.

15. The method of claim 14, further comprising:
the system accepting at least one of the subset criteria from the user.

16. The method of claim 15, further comprising:
the system accepting at least one association from the user wherein the association associates at least one of the subset criteria with at least one of the subtasks.

17. The method of claim 11, wherein the subset criteria comprise a rule based subset criterion.

18. The method of claim 11, further comprising:
the system presenting a subtask entry input to a user; and
the system accepting at least one of the subtasks from the user.

19. The method of claim 11, further comprising:
the system presenting a subset criterion entry input to a user; and
the system accepting at least one of the subset criteria from the user.

20. The method of claim 11, further comprising:
the system accepting at least one association from a user wherein the association associates at least one of the subset criteria with at least one of the subtasks.

* * * * *